United States Patent
Xu

(10) Patent No.: US 10,147,164 B2
(45) Date of Patent: Dec. 4, 2018

(54) ELECTRONIC DEVICE AND DATA-ERASING METHOD

(71) Applicant: Lenovo (Beijing) Limited, Beijing (CN)

(72) Inventor: Fengbo Xu, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 12 days.

(21) Appl. No.: 15/087,516

(22) Filed: Mar. 31, 2016

(65) Prior Publication Data
US 2017/0103496 A1   Apr. 13, 2017

(30) Foreign Application Priority Data
Oct. 13, 2015   (CN) .......................... 2015 1 0659504

(51) Int. Cl.
*G06T 3/40* (2006.01)
*G06T 11/60* (2006.01)
*G06F 3/0481* (2013.01)

(52) U.S. Cl.
CPC ............ *G06T 3/40* (2013.01); *G06F 3/04812* (2013.01); *G06F 3/04817* (2013.01); *G06T 11/60* (2013.01)

(58) Field of Classification Search
CPC ..... G06F 3/0488; G06F 3/04817; G06T 11/60
USPC ....................................................... 345/660
See application file for complete search history.

(56) References Cited

U.S. PATENT DOCUMENTS

| 6,239,792 | B1* | 5/2001 | Yanagisawa | G06F 3/0488 345/159 |
| 9,329,772 | B1* | 5/2016 | Becker | G06F 3/04845 |
| 2004/0207606 | A1* | 10/2004 | Atwood | G06F 3/045 345/173 |
| 2005/0088426 | A1* | 4/2005 | Smirnov | G06F 3/0488 345/179 |
| 2007/0176904 | A1* | 8/2007 | Russo | G06F 3/0414 345/173 |
| 2007/0285399 | A1* | 12/2007 | Lund | G06F 3/04883 345/173 |
| 2008/0273227 | A1* | 11/2008 | Dattilo | H04N 1/38 358/448 |
| 2009/0277697 | A1* | 11/2009 | Bolt | G06F 3/03545 178/19.01 |

(Continued)

FOREIGN PATENT DOCUMENTS

| CN | 102789324 A | 11/2012 |
| CN | 103455258 A | 12/2013 |

(Continued)

*Primary Examiner* — Kimberly A Williams
(74) *Attorney, Agent, or Firm* — Ference & Associates LLC

(57) ABSTRACT

One embodiment provides an electronic device including: a processor; a display device coupled to the processor, wherein the display device displays an electronic eraser that performs an erasing operation of data displayed on the display device, as well as a motion of the electronic eraser as controlled by a user; wherein the processor is configured to detect one or more characteristics of the motion of the electronic eraser; and wherein the processor varies a size of the electronic eraser based on the one or more characteristics of the motion of the electronic eraser that are detected. Other aspects are described and claimed.

16 Claims, 12 Drawing Sheets

---

101 — Acquire a motion feature of an operation body of an eraser in the electronic device when the electronic device is in an erasing processing state 102 — Switch a size of the eraser in the electronic device according to the motion feature of the operation body of the eraser

(56) References Cited

U.S. PATENT DOCUMENTS

| | | | |
|---|---|---|---|
| 2009/0309839 A1* | 12/2009 | Hildebrandt | G06F 3/0321 345/173 |
| 2011/0199297 A1* | 8/2011 | Antonyuk | G06F 3/04883 345/157 |
| 2011/0234516 A1* | 9/2011 | Nakajima | G06F 3/04883 345/173 |
| 2012/0144073 A1* | 6/2012 | Smith | G06F 3/0425 710/33 |
| 2012/0293425 A1* | 11/2012 | Lee | G06F 3/03545 345/173 |
| 2013/0100074 A1* | 4/2013 | Chang | G06F 3/044 345/174 |
| 2013/0283213 A1* | 10/2013 | Guendelman | G06F 3/017 715/848 |
| 2014/0198082 A1* | 7/2014 | Mori | G06F 3/03545 345/179 |
| 2015/0309720 A1* | 10/2015 | Fisher | G06F 3/04845 715/752 |
| 2016/0005205 A1* | 1/2016 | Liang | G06F 3/04883 345/619 |
| 2016/0098186 A1* | 4/2016 | Sugiura | G06F 17/242 345/173 |
| 2017/0371446 A1* | 12/2017 | Ishikura | G06F 3/044 |

FOREIGN PATENT DOCUMENTS

| | | |
|---|---|---|
| CN | 103970462 A | 8/2014 |
| JP | 2016122307 A * | 7/2016 |

\* cited by examiner

ELECTRONIC DEVICE AND DATA-ERASING METHOD

CLAIM FOR PRIORITY

This application claims priority to Chinese Application No. 201510659504.9, filed on Oct. 13, 2015, which is fully incorporated by reference herein.

FIELD

The subject matter described herein relates to size switching technologies in the field of communications, and more specifically, to an eraser size switching method and an electronic device.

BACKGROUND

Along with the improvement of living standards, people's requirements on material life have been met. As science and technology develop, people pay more attention to enrichment of spiritual lives, and people are more willing to use different types of software in electronic products to implement different requirements thereof. It is definite that various image editing software is being more frequently utilized in electronic products.

In various current electronic products, erasing functions in electronic devices are usually used, such as graphics editing software, electronic drawing boards, and electronic white boards. There are several selections for the size of the eraser in the erasing function. The present application discloses an electronic device that provides a useful alternative data-erasing function as well as a data-erasing method.

BRIEF SUMMARY

In summary, one aspect provides an electronic device, comprising: a processor; a display device coupled to the processor, wherein the display device displays an electronic eraser that performs an erasing operation of data displayed on the display device, as well as a motion of the electronic eraser as controlled by the user; a user input device coupled to the processor, wherein the user input device controls a motion of the electronic eraser; wherein the processor is configured to detect one or more characteristics of the motion of the electronic eraser; and wherein the processor varies a size of the electronic eraser based on the one or more characteristics of the motion of the electronic eraser that are detected.

Another aspect provides an electronic device, comprising: a processor; an acquiring unit; and a switching unit; wherein: the acquiring unit is configured to acquire a motion feature of an operation body of an eraser in the electronic device when the electronic device is in an erasing processing state, and wherein the operation body and the eraser have a corresponding relation, and the switching unit is configured to switch a size of the eraser in the electronic device according to the motion feature of the operation body of the eraser.

A further aspect provides a data-erasing method, comprising: controlling, on a user input device, motion of an electronic eraser displayed on a display device, wherein the electronic eraser is configured to perform an erasing operation of data displayed on the display device; detecting, using a processor, one or more characteristics of the motion of the electronic eraser; and varying, using the processor, a size of the electronic eraser that is displayed on the display device based on the detected one or more characteristics of the motion of the electronic eraser.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Figure 1:
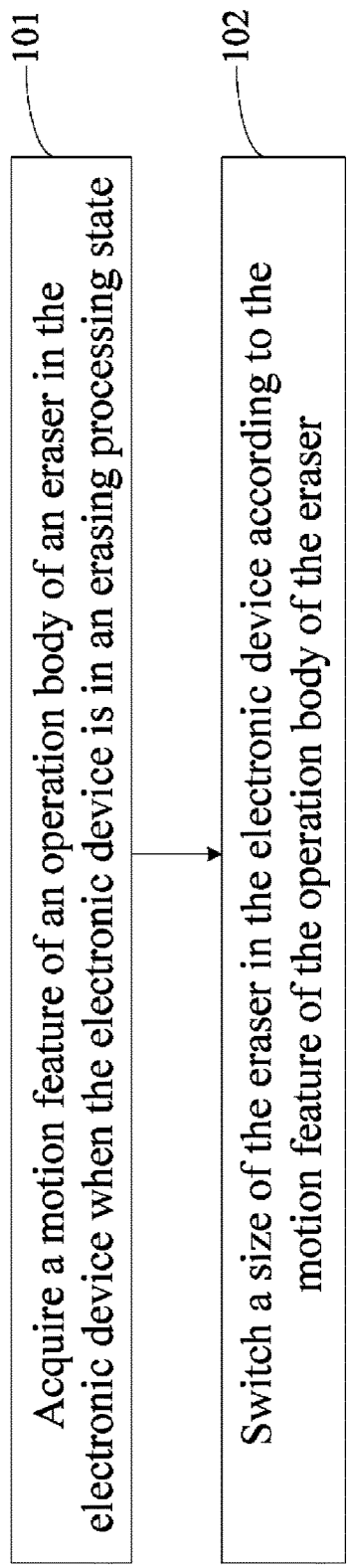
FIG. 1 is a flow chart of an eraser size switching method in accordance with an embodiment.

An embodiment provides an eraser size switching method applied to an electronic device, as shown in FIG. 1. The method includes, at 101, acquiring a motion feature of an operation body of an eraser in the electronic device when the electronic device is in an erasing processing state. The operation body and the eraser have a corresponding relation. Specifically, the operation body may be a cursor that presents motion of the eraser and is displayed on the electronic device after the eraser receives a click operation from a user, and the acquiring the motion feature of the operation body of the eraser in the electronic device is acquiring a motion feature of the cursor displayed on the electronic device. The motion feature of the operation body of the eraser may comprise a motion speed of the operation body, a changing trend of the motion speed of the operation body, a motion track of the operation body, a motion range of the operation body, and other features. The motion feature of the operation body is illustrated by examples, however, these examples are not intended to be limiting. In exemplary applications, it may be determined according to specific application scenarios.

At 102, the method includes switching a size of the eraser in the electronic device according to the motion feature of the operation body of the eraser. Specifically, the step of switching the size of the eraser in the electronic device according to the motion feature of the operation body of the eraser may be switching the size of the eraser to a size corresponding to the motion feature of the operation body according to the motion speed of the operation body, the changing trend of the motion speed, the motion track, the motion range and other features.

In the eraser size switching method in accordance with an embodiment, a motion feature of an operation body of an eraser in the electronic device is acquired when the electronic device is in an erasing processing state; and the size of the eraser in the electronic device is switched according to the motion feature of the operation body of the eraser. In this way, when the user performs an erasing process by using the eraser, the size of the eraser may be directly switched according to the motion feature of the operation body of the eraser, so that rapid erasing of an object needed to be erased can be implemented, the size of the eraser can be switched automatically, thereby reducing operation steps, and meanwhile, improving the interaction capability of the user and the electronic device.

Figure 2:
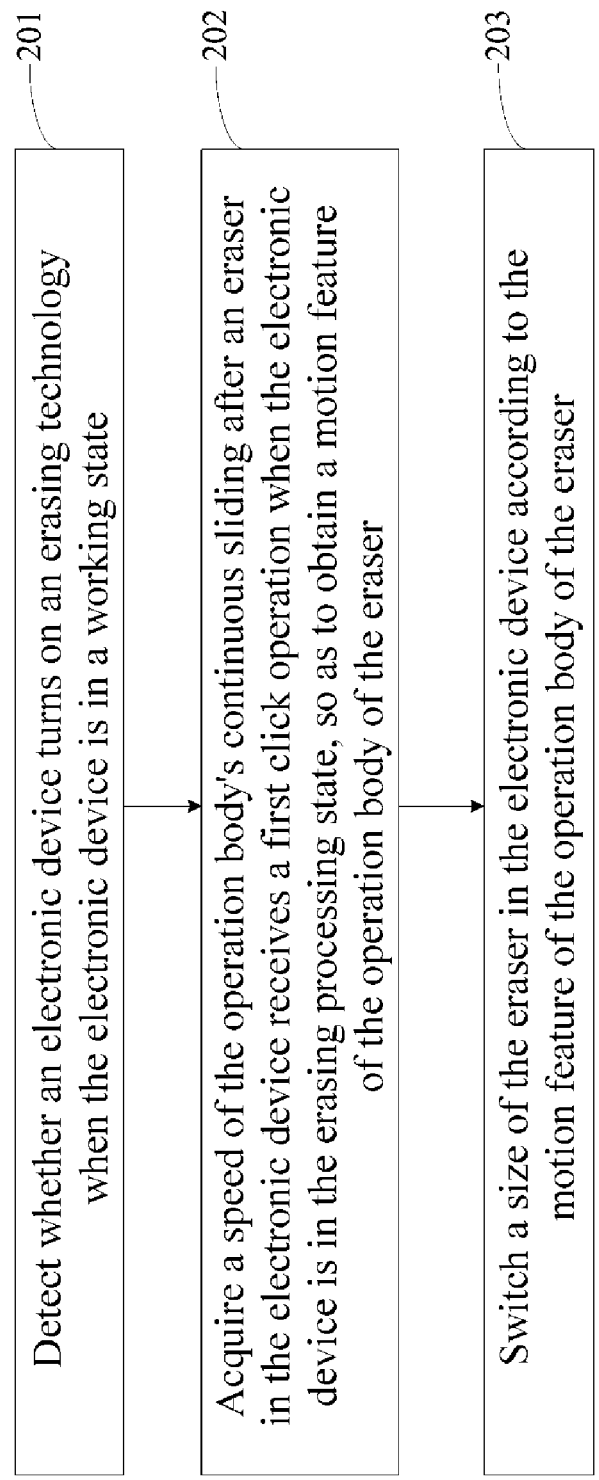
FIG. 2 is a flow chart of an eraser size switching method in accordance with an embodiment.

An embodiment provides an eraser size switching method applied to an electronic device, as shown in FIG. 2. The method includes, at 201, detecting whether the electronic device turns on an erasing technology when the electronic device is in a working state. Specifically, whether the electronic device turns on the erasing technology is obtained by detecting whether the electronic device currently opens an erasing technology application; if the electronic device turns on the erasing technology, it indicates that the electronic device is currently in an erasing processing state.

At 202, the method includes acquiring a speed of an operation body's continuous sliding after an eraser in the electronic device receives a first click operation when the electronic device is in the erasing processing state, so as to obtain a motion feature of the operation body of the eraser. Specifically, after the user clicks on the eraser in the electronic device, the user controls the operation body corresponding to the eraser to move continuously, the electronic device acquires the speed when the operation body, that is, the cursor displayed on the electronic device, moves continuously, and the speed of continuous movement of the operation body is the motion feature of the operation body of the eraser. The acquired speed of the operation body's continuous movement may be in a range of size and may also be a specific value.

At 203, the method includes switching a size of the eraser in the electronic device according to the motion feature of the operation body of the eraser. Specifically, the size of the eraser is switched, according to the magnitude of the obtained speed of continuous movement of the operation body, to a size corresponding to the speed of continuous movement of the operation body. For example, if the size of the eraser set in the erasing technology comprises a first size, a second size and a third size, the third size is greater than the second size, and the second size is greater than the first size; if the speed of continuous movement of the operation body of the eraser is greater than a first preset speed but is less than a second preset speed, the size of the eraser is switched to the second size; if the speed of continuous movement of the operation body of the eraser is less than the first preset speed, the size of the eraser is switched to the first size, that is, the minimum size; and if the speed of continuous movement of the eraser is greater than the second preset speed, the size of the eraser is switched to the third size, that is, the maximum size. The first preset speed and the second preset speed are preset according to user preferences, and are stored in the electronic device. Switching the size of the eraser in the electronic device according to the motion feature of the operation body of the eraser is described herein by the examples, however, these examples are not limited to only being implemented by using the aforementioned method.

It should be noted that, explanations of the steps in this embodiment, similar to those in the above embodiment, may be obtained with reference to the descriptions in the above embodiment, and are not repeated herein.

In the eraser size switching method in accordance with an embodiment, a motion feature of an operation body of an eraser in the electronic device is acquired when the electronic device is in an erasing processing state and the size of the eraser in the electronic device is switched according to the motion feature of the operation body of the eraser. In this way, when the user performs an erasing process by using the eraser, the size of the eraser may be directly switched according to the motion feature of the operation body of the eraser, so that rapid erasing of an object needed to be erased can be implemented, the size of the eraser can be switched automatically, thereby reducing operation steps, and meanwhile, improving the interaction capability of the user and the electronic device.

Figure 3:
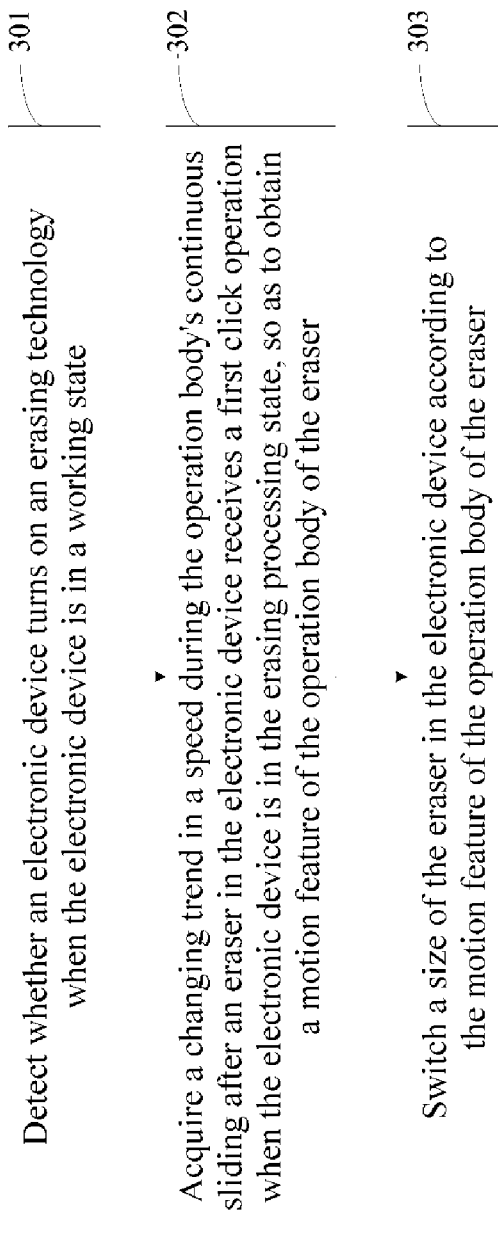
FIG. 3 is a flow chart of an eraser size switching method in accordance with an embodiment.

An embodiment provides an eraser size switching method applied to an electronic device, as shown in FIG. 3. The method includes, at 301, detecting whether the electronic device turns on an erasing technology when the electronic device is in a working state.

At 302, the method includes acquiring a changing trend in a speed during the operation body's continuous sliding after an eraser in the electronic device receives a first click operation when the electronic device is in the erasing processing state, so as to obtain the motion feature of the operation body of the eraser. Specifically, after the user clicks on the eraser in the electronic device, the user controls the operation body corresponding to the eraser to move continuously, the electronic device acquires the changing trend of the speed when the operation body, that is, the cursor displayed on the electronic device, moves continuously, and the changing trend of the speed of continuous movement of the operation body is the motion feature of the operation body of the eraser.

At 303, the method includes switching a size of the eraser in the electronic device according to the motion feature of the operation body of the eraser. Specifically, the size of the eraser may be switched, according to the obtained changing trend of the speed of continuous movement of the operation body, to a size corresponding to the changing trend of the speed of continuous movement of the operation body. For example, if the size of the eraser set in the erasing technology comprises a first size, a second size and a third size, the third size is greater than the second size, and the second size is greater than the first size. If the speed of continuous movement of the operation body of the eraser changes from small to large, it indicates that the area of a region needed to be erased by the eraser is large, in this case, the size of the eraser may be switched to a size greater than the current size, and specifically, a magnitude by which the size of the eraser is switched to a size greater than the current size may be determined according to the range of the moving speed of the operation body of the eraser changing from small to large. If the speed of continuous movement of the operation body of the eraser changes from large to small, it indicates that the area of a region needed to be erased by the eraser is small, in this case, the size of the eraser may be switched to a size less than the current size, and specifically, a magnitude by which the size of the eraser is switched to a size less than the current size may be determined according to the range of the moving speed of the operation body of the eraser changing from large to small. Switching the size of the eraser in the electronic device according to the motion feature of the operation body of the eraser is described herein by the examples, however, these examples are not limited to only being implemented by using the aforementioned method.

It should be noted that, explanations of the steps in this embodiment, similar to those in the above embodiment, may be obtained with reference to the descriptions in the above embodiment, and are not repeated herein.

In the eraser size switching method in accordance with an embodiment, a motion feature of an operation body of an eraser in the electronic device is acquired when the electronic device is in an erasing processing state and the size of the eraser in the electronic device is switched according to the motion feature of the operation body of the eraser. In this way, when the user performs an erasing process by using the eraser, the size of the eraser may be directly switched according to the motion feature of the operation body of the eraser, so that rapid erasing of an object needed to be erased can be implemented, the size of the eraser can be switched automatically, thereby reducing operation steps, and meanwhile, improving the interaction capability of the user and the electronic device.

Figure 4:
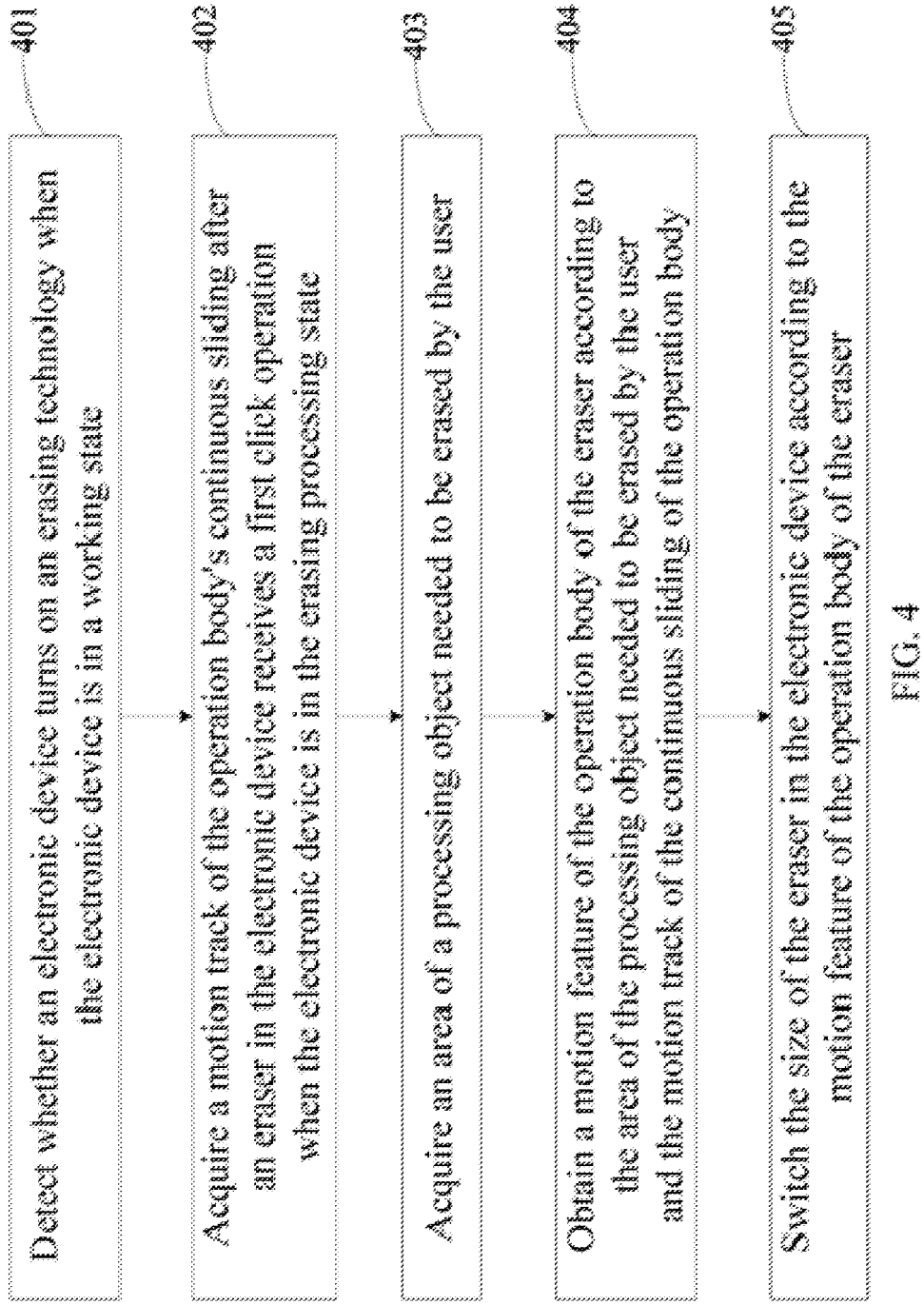
FIG. 4 is a flow chart of an eraser size switching method in accordance with an embodiment.

An embodiment provides an eraser size switching method applied to an electronic device, as shown in FIG. 4. The method includes, at 401, detecting whether the electronic device turns on an erasing technology when the electronic device is in a working state.

At 402, the method includes acquiring a motion track of the operation body's continuous sliding after an eraser in the electronic device receives a first click operation when the electronic device is in the erasing processing state. Specifically, after the user clicks on the eraser in the electronic device, the user controls the operation body corresponding to the eraser to move continuously, the electronic device acquires the motion track when the operation body, that is, the cursor displayed on the electronic device, moves continuously, and the motion track may comprise erasing in a single direction or erasing in a reciprocating manner, etc.

At 403, the method includes acquiring an area of a processing object needed to be erased by the user. A region of a processing object needed to be erased by the user is acquired, and the area of the region of the processing object needed to be erased is calculated. Specifically, the area of the processing object needed to be erased may be obtained by acquiring the area of a region through which the cursor slides continuously after being clicked for the first time.

At 404, the method includes obtaining the motion feature of the operation body of the eraser according to the area of the processing object needed to be erased by the user and the motion track of the operation body's continuous sliding. Specifically, the motion track of the operation body's continuous sliding and the area of the processing object needed to be erased are the motion feature of the operation body of the eraser.

At 405, the method includes switching a size of the eraser in the electronic device according to the motion feature of the operation body of the eraser. Specifically, the size of the eraser is switched according to the motion track of the operation body sliding continuously, that is, the erasing in the single direction or the erasing in the reciprocating manner, and the area of the processing object needed to be erased. For example, if the size of the eraser set in the erasing technology comprises a first size, a second size and a third size, the third size is greater than the second size, and the second size is greater than the first size. If the motion track of the operation body of the eraser is erasing in a single direction and the area of the processing object needed to be erased is less than or equal to a first preset area, the size of the eraser is switched to the first size. If the motion track of the operation body of the eraser is erasing in a single direction and the area of the processing object needed to be erased is greater than the first preset area and is less than or equal to a second preset area, the size of the eraser is switched to the second size. If the motion track of the operation body of the eraser is erasing in the reciprocating manner and the area of the processing object needed to be erased is greater than the second preset area, the size of the eraser is switched to the third size. If the motion track of the operation body of the eraser is erasing in the reciprocating manner and the area of the processing object needed to be erased is less than the second preset area and is greater than the first size, the size of the eraser is switched to the second size, and so on, where the first preset area and the second preset area are preset according to the using habits of the user in the actual using process and are stored in the electronic device. Switching the size of the eraser in the electronic device according to the motion feature of the operation body of the eraser is described herein by the examples, however, these examples are not limited to only being implemented by using the aforementioned method.

It should be noted that, explanations of the steps in this embodiment, similar to those in the above embodiment, may be obtained with reference to the descriptions in the above embodiment, and are not repeated herein.

In the eraser size switching method in accordance with an embodiment, a motion feature of an operation body of an eraser in the electronic device is acquired when the electronic device is in an erasing processing state and the size of the eraser in the electronic device is switched according to the motion feature of the operation body of the eraser. In this way, when the user performs an erasing process by using the eraser, the size of the eraser may be directly switched according to the motion feature of the operation body of the eraser, so that rapid erasing of an object needed to be erased can be implemented, the size of the eraser can be switched automatically, thereby reducing operation steps, and meanwhile, improving the interaction capability of the user and the electronic device.

Figure 5:
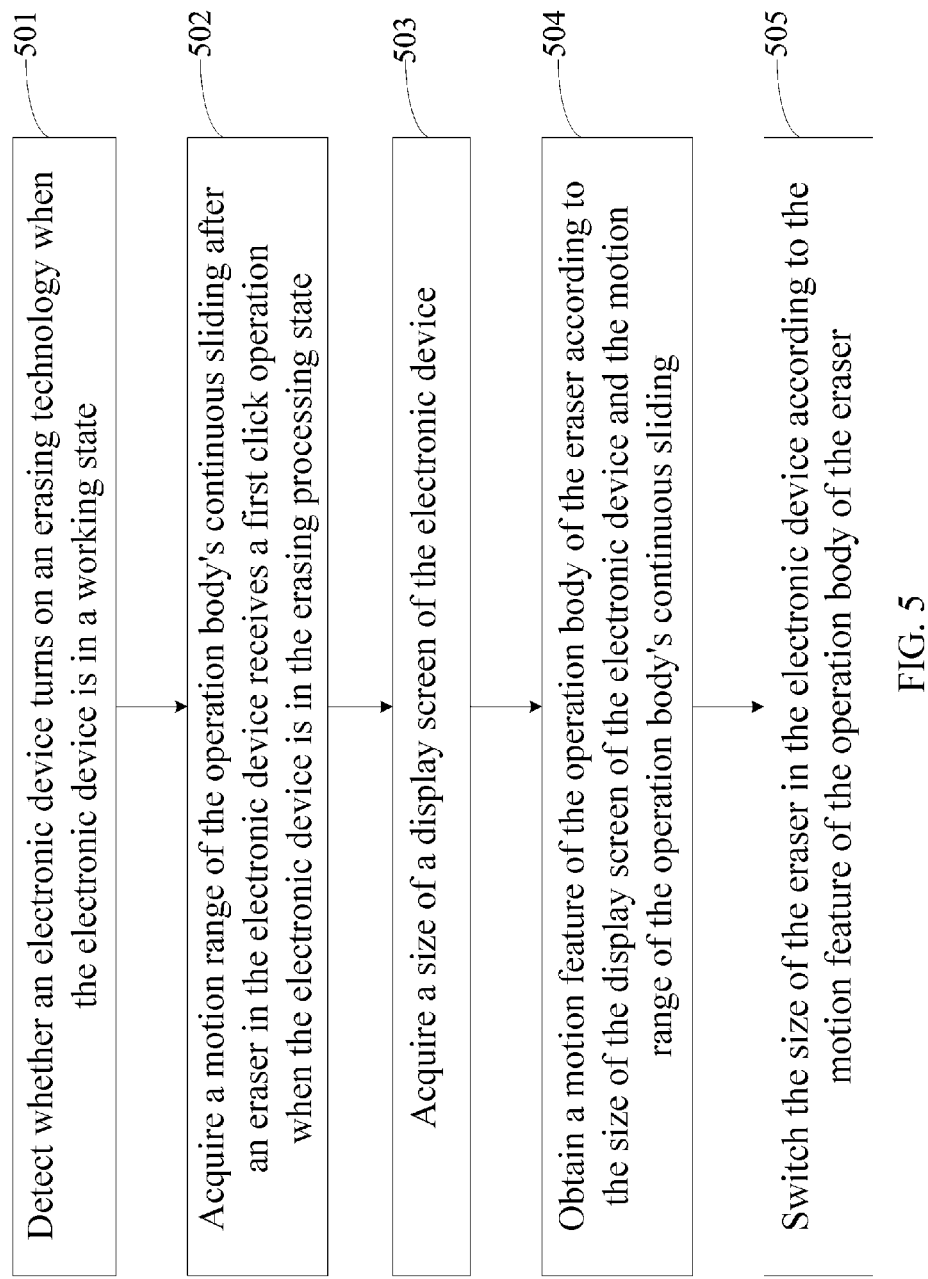
FIG. 5 is a flow chart of an eraser size switching method in accordance with an embodiment.

An embodiment provides an eraser size switching method applied to an electronic device, as shown in FIG. 5. The method includes, at 501, detecting whether the electronic device turns on an erasing technology when the electronic device is in a working state.

At 502, the method includes acquiring a motion range of the operation body's continuous sliding after an eraser in the electronic device receives a first click operation when the electronic device is in the erasing processing state. Specifically, after the user clicks on the eraser in the electronic device, the user controls the operation body corresponding to the eraser to move continuously, the electronic device acquires the motion range when the operation body, that is, the cursor displayed on the electronic device, moves continuously, and the motion range may be erasing in a small range or erasing in a large range, and specifically, the motion range may be obtained by calculating the area of a region in which the cursor moves continuously.

At 503, the method includes acquiring a size of a display screen of the electronic device. Specifically, the size of the display screen of the electronic device may be information pre-stored in the electronic device when the electronic device leaves the factory, and the size of the screen may be obtained by directly reading from the electronic device.

At 504, the method includes obtaining the motion feature of the operation body of the eraser according to the size of the display screen of the electronic device and the motion range of the operation body's continuous sliding. Specifically, the motion feature of the operation body of the eraser may be obtained according to a proportion relationship between the motion range of the operation body's continuous sliding and the size of the display screen of the electronic device.

At 505, the method includes switching a size of the eraser in the electronic device according to the motion feature of the operation body of the eraser. Specifically, the size of the eraser may be switched according to the proportion relationship between the motion range of the operation body's continuous sliding and the size of the display screen. For example, if the size of the eraser set in the erasing technology comprises a first size, a second size and a third size, the third size is greater than the second size, and the second size is greater than the first size. If the proportion relationship between the motion range of the operation body of the eraser and the size of the display screen of the electronic device is less than or equal to a first preset relationship, the size of the eraser is switched to the first size. If the proportion relationship between the motion range of the operation body of the eraser and the size of the display screen of the electronic device is greater than the first preset relationship and less than or equal to a second preset relationship, the size of the eraser is switched to the second size. If the proportion relationship between the motion range of the operation body of the eraser and the size of the display screen of the electronic device is greater than a third preset relationship, the size of the eraser is switched to the third size, where the first preset relationship and the second preset relationship are preset according to the using habits of the user in the actual using process and are stored in the electronic device. Switching the size of the eraser in the electronic device according to the motion feature of the operation body of the eraser is described herein by the examples, however, these examples are not limited to only being implemented by using the aforementioned method.

It should be noted that, explanations of the steps in this embodiment, similar to those in the above embodiment, may be obtained with reference to the descriptions in the above embodiment, and are not repeated herein.

In the eraser size switching method in accordance with an embodiment, a motion feature of an operation body of an eraser in the electronic device is acquired when the electronic device is in an erasing processing state; and the size of the eraser in the electronic device is switched according to the motion feature of the operation body of the eraser. In this way, when the user performs an erasing process by using the eraser, the size of the eraser may be directly switched according to the motion feature of the operation body of the eraser, so that rapid erasing of an object needed to be erased can be implemented, the size of the eraser can be switched automatically, thereby reducing operation steps, and meanwhile, improving the interaction capability of the user and the electronic device.

Figure 6:
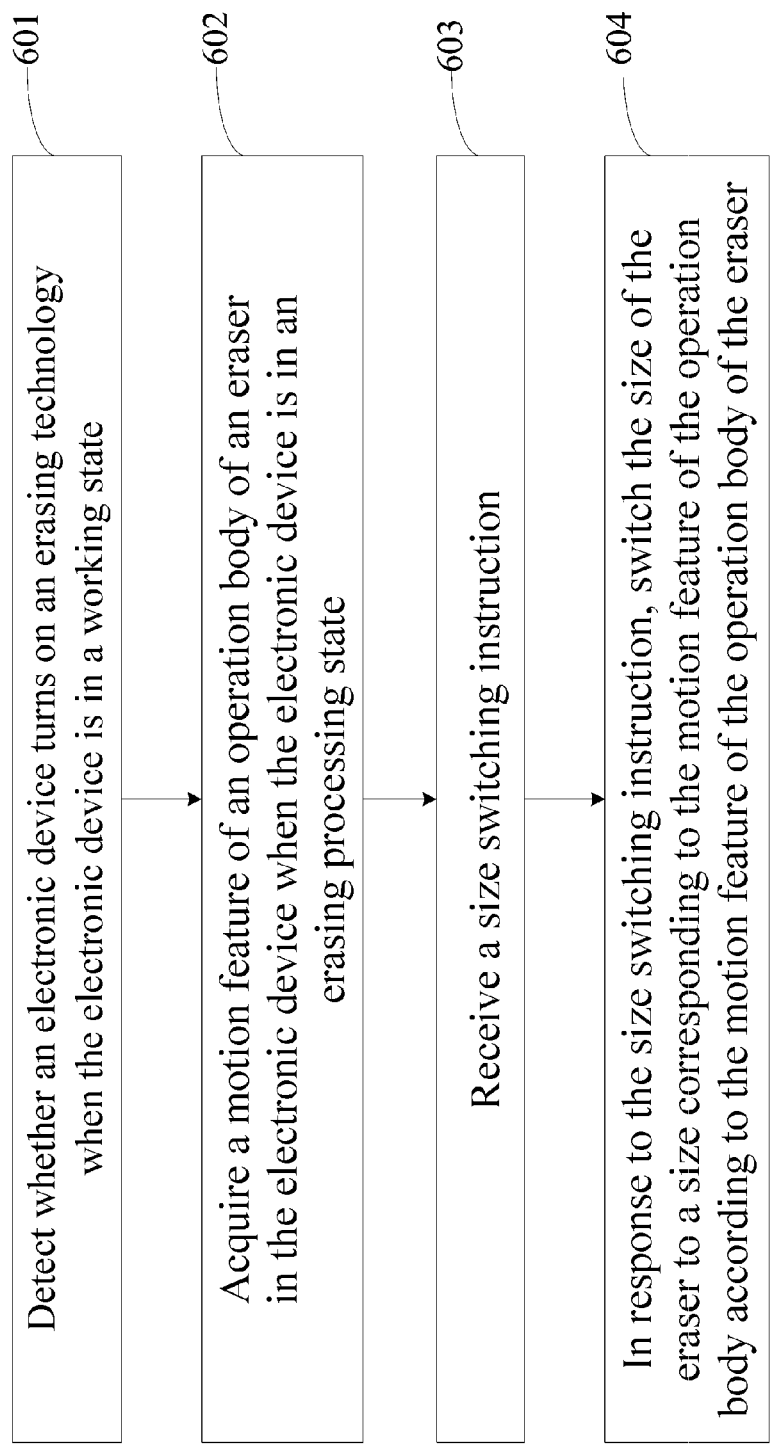
FIG. 6 is a flow chart of an eraser size switching method in accordance with an embodiment.

An embodiment provides an eraser size switching method applied to an electronic device, as shown in FIG. 6. The method includes, at 601, detecting whether the electronic device turns on an erasing technology when the electronic device is in a working state.

At 602, the method includes acquiring a motion feature of an operation body of an eraser in the electronic device when the electronic device is in an erasing processing state. The operation body and the eraser have a corresponding relation.

At 603, the method includes receiving a size switching instruction. The size switching instruction may be obtained after the user performs a first operation on the electronic device; the first operation may be an operation such as a single click operation or a double click operation performed by the user on the cursor currently displayed on the electronic device, and specifically, the first operation may be set by the user according to the habits and preferences of the user.

At 604, in response to the size switching instruction, the method includes switching the size of the eraser to a size corresponding to the motion feature of the operation body according to the motion feature of the operation body of the eraser.

It should be noted that, explanations of the steps in this embodiment, similar to those in the above embodiment, may be obtained with reference to the descriptions in the above embodiment, and are not repeated herein.

In the eraser size switching method in accordance with an embodiment, a motion feature of an operation body of an eraser in the electronic device is acquired when the electronic device is in an erasing processing state and the size of the eraser in the electronic device is switched according to the motion feature of the operation body of the eraser. In this way, when the user performs an erasing process by using the eraser, the size of the eraser may be directly switched according to the motion feature of the operation body of the eraser, so that rapid erasing of an object needed to be erased can be implemented, the size of the eraser can be switched automatically, thereby reducing operation steps, and meanwhile, improving the interaction capability of the user and the electronic device.

An embodiment provides an electronic device 7 having a processor and a display device coupled to the processor, wherein the display device operatively displays an electronic eraser to perform an erasing operation of data displayed thereon. The electronic device 7 further comprises a user input device coupled to the processor, the user input device being operable to control motion of the electronic eraser, wherein the processor is configured to detect one or more characteristics of said motion of the electronic eraser, and to vary a size of the electronic eraser that is displayed on the display device based on the detected one or more characteristics of said motion of the electronic eraser.

Figure 7:
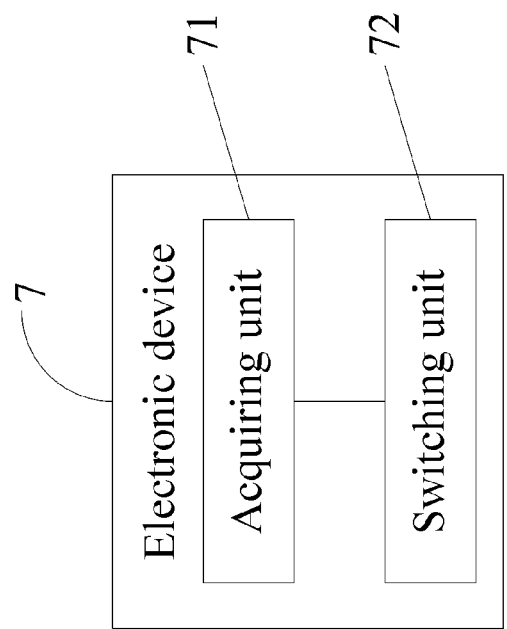
FIG. 7 is a schematic structural drawing of an electronic device in accordance with an embodiment.

The electronic device 7 applies an eraser size switching method provided in the embodiment corresponding to FIG. 1 to FIG. 6, and as shown in FIG. 7. In an embodiment, the electronic device 7 comprises: an acquiring unit 71 and a switching unit 72, wherein the acquiring unit 71 is configured to acquire a motion feature of an operation body of an eraser in the electronic device 7 when the electronic device 7 is in an erasing processing state. The operation body and the eraser have a corresponding relation. The switching unit 72 is configured to switch a size of the eraser in the electronic device according to the motion feature of the operation body of the eraser.

In the electronic device provided in accordance with an embodiment, a motion feature of an operation body of an eraser in the electronic device is acquired when the electronic device is in an erasing processing state and the size of the eraser in the electronic device is switched according to the motion feature of the operation body of the eraser. In this way, when the user performs an erasing process by using the eraser, the size of the eraser may be directly switched according to the motion feature of the operation body of the eraser, so that rapid erasing of an object needed to be erased can be implemented, the size of the eraser can be switched automatically, thereby reducing operation steps, and meanwhile, improving the interaction capability of the user and the electronic device.

Figure 8:
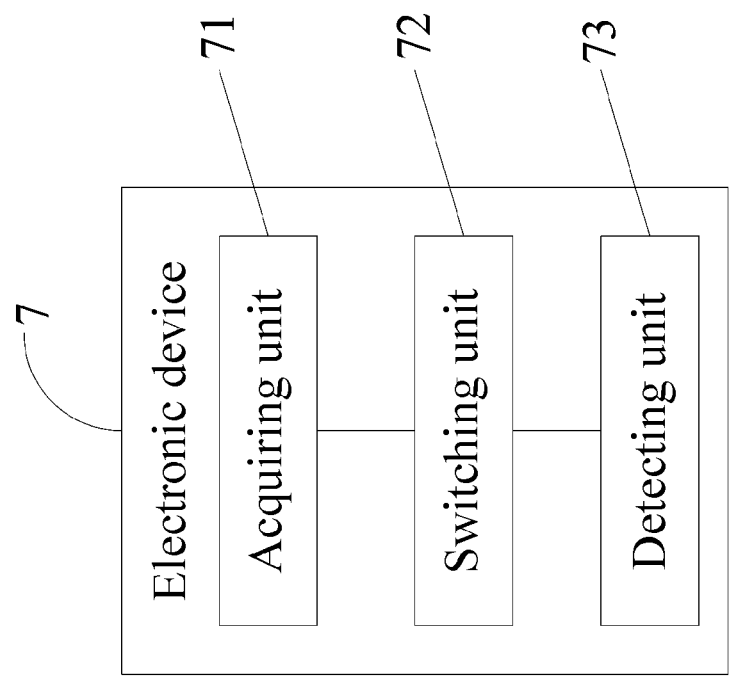
FIG. 8 is a schematic structural view of an electronic device in accordance with an embodiment.

Further, referring to FIG. 8, the electronic device 7 further comprises: a detecting unit 73 wherein the detecting unit 73 is configured to detect whether the electronic device 7 turns on an erasing technology when the electronic device 7 is in a working state.

Figure 9:
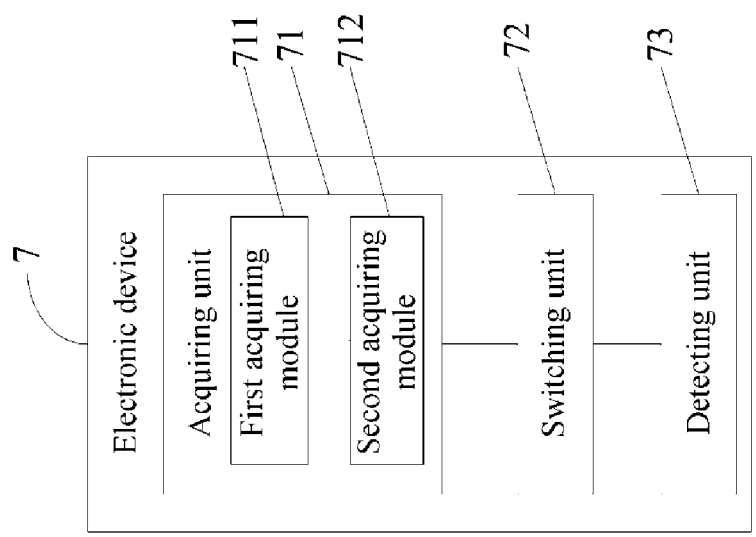
FIG. 9 is a schematic structural view of an electronic device in accordance with an embodiment.

Specifically, referring to FIG. 9, the acquiring unit 71 comprises: a first acquiring module 711, wherein the first acquiring module 711 is configured to acquire a speed of the operation body's continuous sliding after the eraser in the electronic device 7 receives a first click operation when the electronic device 7 is in the erasing processing state, so as to obtain the motion feature of the operation body of the eraser.

The acquiring unit 71 further comprises: a second acquiring module 712, wherein the second acquiring module 712 is configured to acquire a changing trend in a speed during the operation body's continuous sliding after the eraser in the electronic device receives a first click operation when the electronic device 7 is in the erasing processing state, so as to obtain the motion feature of the operation body of the eraser.

Figure 10:
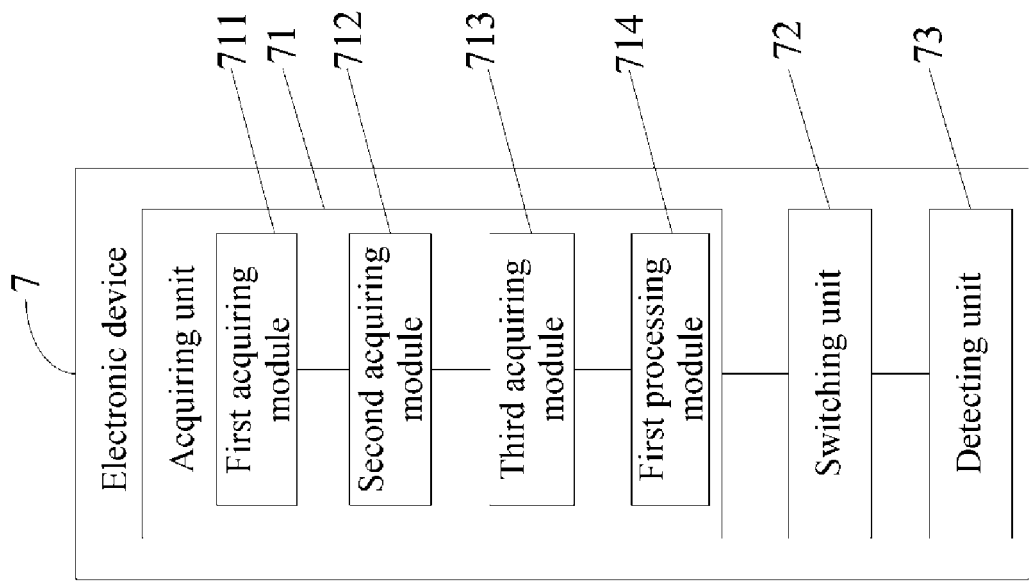
FIG. 10 is a schematic structural view of an electronic device in accordance with an embodiment.

Referring to FIG. 10, the acquiring unit 71 further comprises: a third acquiring module 713 and a first processing module 714, wherein the third acquiring module 713 is configured to acquire a motion track of the operation body's continuous sliding after the eraser in the electronic device receives a first click operation when the electronic device is in the erasing processing state. The third acquiring module 713 is further configured to acquire an area of a processing object needed to be erased by the user. The first processing module 714 is configured to obtain the motion feature of the operation body of the eraser according to the area of the processing object needed to be erased by the user and the motion track of the operation body's continuous sliding obtained by the third acquiring module 713.

Figure 11:
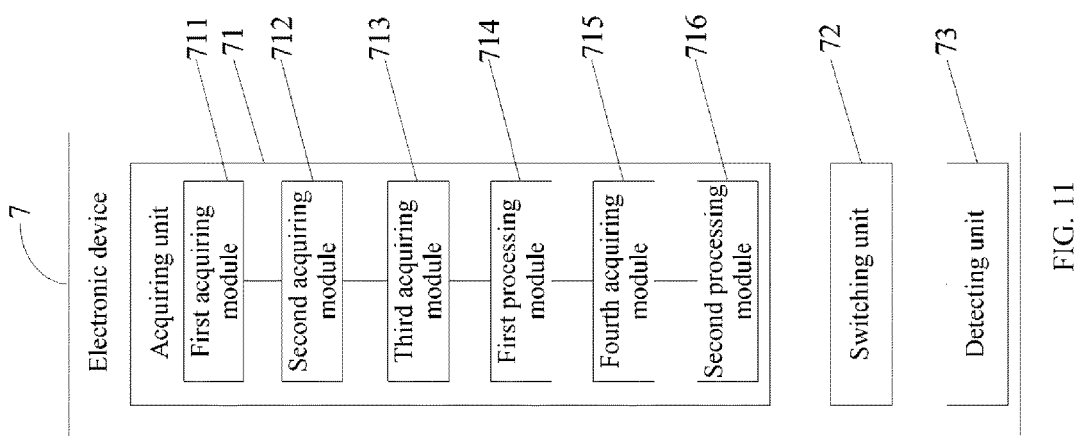
FIG. 11 is a schematic structural view of an electronic device in accordance with an embodiment.

Referring to FIG. 11, the acquiring unit 71 further comprises: a fourth acquiring module 715 and a second processing module 716, wherein the fourth acquiring module 715 is configured to acquire a motion range of the operation body's continuous sliding after the eraser in the electronic device 7 receives a first click operation when the electronic device 7 is in the erasing processing state. The second processing module 716 is configured to obtain the motion feature of the operation body of the eraser according to the size of the display screen of the electronic device 7 and the motion range of the operation body's continuous sliding.

Figure 12:
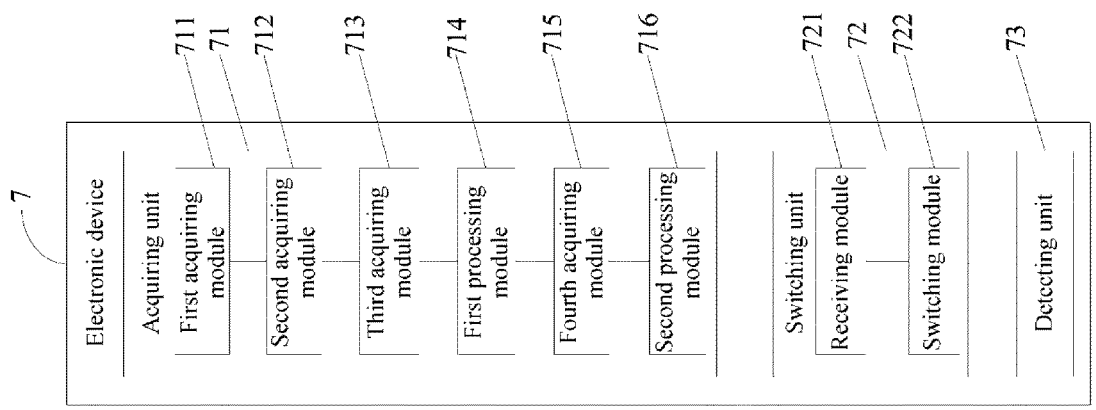
FIG. 12 is a schematic structural view of an electronic device in accordance with an embodiment.

Specifically, referring to FIG. 12, the switching unit 72 comprises: a receiving module 721 and a switching module 722, wherein the receiving module 721 is configured to receive a size switching instruction. The switching module 722 is configured to, in response to the size switching instruction obtained by the receiving module 721, switch the size of the eraser to a size corresponding to the motion feature of the operation body according to the motion feature of the operation body of the eraser.

It should be noted that, interaction processes between the units and modules in this embodiment may be obtained with reference to the interaction processes in the eraser size switching method provided in the embodiments corresponding to FIG. 1 to FIG. 6, and are not repeated herein.

In the electronic device provided in accordance with an embodiment, a motion feature of an operation body of an eraser in the electronic device is acquired when the electronic device is in an erasing processing state and the size of the eraser in the electronic device is switched according to the motion feature of the operation body of the eraser. In this way, when the user performs an erasing process by using the eraser, the size of the eraser may be directly switched according to the motion feature of the operation body of the eraser, so that rapid erasing of an object needed to be erased can be implemented, the size of the eraser can be switched automatically, thereby reducing operation steps, and meanwhile, improving the interaction capability of the user and the electronic device.

In an actual application, the acquiring unit 71, the switching unit 72, the detecting unit 73, the first acquiring module 711, the second acquiring module 712, the third acquiring module 713, the first processing module 714, the fourth acquiring module 715, the second processing module 716, the receiving module 721 and the switching module 722 may all be implemented by using a Central Processing Unit (CPU), a Micro-Processor Unit (MPU), a Digital Signal Processor (DSP), a Field Programmable Gate Array (FPGA) or the like in a wireless data sending device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith. In the context of this document, a readable medium is not a signal and "non-transitory" includes all media except signal media.

Embodiments are described with reference to flow charts and/or block diagrams of methods, devices (systems), and computer program products according to various example embodiments. It should be understood that, each process and/or block in the flow charts and/or block diagrams and a combination of processes and/or blocks in the flow charts and/or block diagrams may be implemented by using computer program instructions. The computer program instructions may be provided to a general computer, a dedicated computer, an embedded processor, or a processor of another programmable data processing device to generate a machine, so that the instructions executed by the computer or the processor of other programmable data processing device generates an apparatus configured to implement functions designated in one or more processes in the flow charts and/or one or more blocks in the block diagrams.

The computer program instructions may also be stored in a computer readable memory that can guide the computer or other programmable data processing device to work in a specific manner, so that the instruction stored in the computer readable memory generates a product including an instruction apparatus, and the instruction apparatus implements functions designated in one or more processes in the flow charts and/or one or more blocks in the block diagrams.

The computer program instructions may also be loaded to the computer or other programmable data processing devices, so that a series of operational steps are executed on the computer or other programmable devices to generate computer implemented processing, and therefore, instructions executed on the computer or other programmable devices provide steps used to implement functions designated in one or more processes in the flow charts and/or one or more blocks in the block diagrams.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An electronic device, comprising:
    a display device, wherein the display device displays an electronic eraser that performs an erasing operation of data displayed on the display device, as well as a motion of the electronic eraser as controlled by a user;
    a processor;
    a memory device that stores instructions executable by the processor to:
    identify a size of the display device;
    identify a size of an area associated with the data to be erased based on a movement range of the electronic eraser;
    determine a proportional relationship between the size of the display device and the movement range; and
    adjust a size of the electronic eraser based on the proportional relationship.

2. The electronic device of claim 1, further comprising a detecting unit, wherein the detecting unit is configured to detect whether the electronic device turns on an erasing technology if the electronic device is in a working state.

3. An electronic device, comprising:
    a processor;
    an acquiring unit;
    a switching unit;
    a memory device that stores instructions executable by the processor to:
    acquire, using the acquiring unit, a motion feature of an operation body of an eraser in the electronic device when the electronic device is in an erasing processing state, and wherein the operation body and the eraser have a corresponding relation, and
    switch, using the switching unit, a size of the eraser in the electronic device according to the motion feature of the operation body of the eraser and a movement range of the electronic eraser, wherein the movement range is associated with a size of an area of data to be erased.

4. The electronic device of claim 3, wherein the acquiring unit comprises a first acquiring module, wherein:
    the first acquiring module is configured to acquire a speed of the operation body's continuous sliding after the eraser in the electronic device receives a first click operation when the electronic device is in the erasing processing state, so as to obtain the motion feature of the operation body of the eraser.

5. The electronic device of claim 3, wherein the acquiring unit comprises a second acquiring module, wherein:
    the second acquiring module is configured to acquire a changing trend in a speed of the operation body's continuous sliding after the eraser in the electronic device receives a first click operation when the electronic device is in the erasing processing state, so as to obtain the motion feature of the operation body of the eraser.

6. The electronic device of claim 3, wherein the acquiring unit comprises a third acquiring module, wherein:
    the third acquiring module is configured to acquire a motion track of the operation body's continuous sliding after the eraser in the electronic device receives a first click operation when the electronic device is in the erasing processing state; and
    the third acquiring module is further configured to acquire an area of a processing object needed to be erased by the user.

7. The electronic device of claim 6, wherein the acquiring unit comprises a first processing module, wherein the first processing module is configured to obtain the motion feature of the operation body of the eraser according to the area of the processing object needed to be erased by the user and the motion track of the operation body's continuous sliding.

8. The electronic device of claim 3, wherein the switching unit comprises:
    a receiving module; and
    and a switching module;
    wherein the receiving module is configured to receive a size switching instruction; and
    wherein the switching module is configured to, in response to the size switching instruction, switch the size of the eraser to a size corresponding to the motion feature of the operation body according to the motion feature of the operation body of the eraser.

9. A data-erasing method, comprising:
    controlling motion of an electronic eraser displayed on a display device, wherein the electronic eraser is configured to perform an erasing operation of data displayed on the display device;
    identify a size of the display device;
    identifying a size of an area associated with the data to be erased based on a movement range of the electronic eraser;

determine a proportional relationship between the size of the display device and the movement range; and adjusting a size of the electronic eraser that is displayed on the display device based on the proportional relationship.

10. The method of claim 9, further comprising:

detecting whether the electronic device turns on an erasing technology when the electronic device is in a working state; and acquiring a motion feature of an operation body of an eraser in the electronic device when the electronic device is in an erasing processing state.

11. The method of claim 10, wherein the acquiring comprises acquiring a speed of the operation body's continuous sliding after the eraser in the electronic device receives a first click operation when the electronic device is in the erasing processing state, so as to obtain the motion feature of the operation body of the eraser.

12. The method of claim 10, wherein the acquiring comprises acquiring a changing trend in speed during the operation body's continuous sliding after the eraser in the electronic device receives a first click operation when the electronic device is in the erasing processing state, so as to obtain the motion feature of the operation body of the eraser.

13. The method of claim 10, wherein the acquiring comprises:

acquiring a motion track of the operation body's continuous sliding after the eraser in the electronic device receives a first click operation when the electronic device is in the erasing processing state; and acquiring an area of a processing object needed to be erased by the user.

14. The method of claim 13, further comprising obtaining the motion feature of the operation body of the eraser according to the area of the processing object needed to be erased by the user and the motion track of the operation body's continuous sliding.

15. The method of claim 9, further comprising switching the size of the eraser in the electronic device according to the motion feature of the operation body of the eraser.

16. The method of claim 15, wherein the switching comprises:

receiving a size switching instruction; and switching, in response to the size switching instruction, the size of the eraser to a size corresponding to the motion feature of the operation body according to the motion feature of the operation body of the eraser.

\* \* \* \* \*